H. H. VICKERS.
COMBINED TYPEWRITING AND COMPUTING MACHINE.
APPLICATION FILED JAN. 24, 1921.

1,416,766.

Patented May 23, 1922.
2 SHEETS—SHEET 1.

Fig. 1.

Inventor:
Harry H. Vickers
by D. C. Stickney
Attorney

H. H. VICKERS.
COMBINED TYPEWRITING AND COMPUTING MACHINE.
APPLICATION FILED JAN. 24, 1921.
1,416,766.
Patented May 23, 1922.
2 SHEETS—SHEET 2.
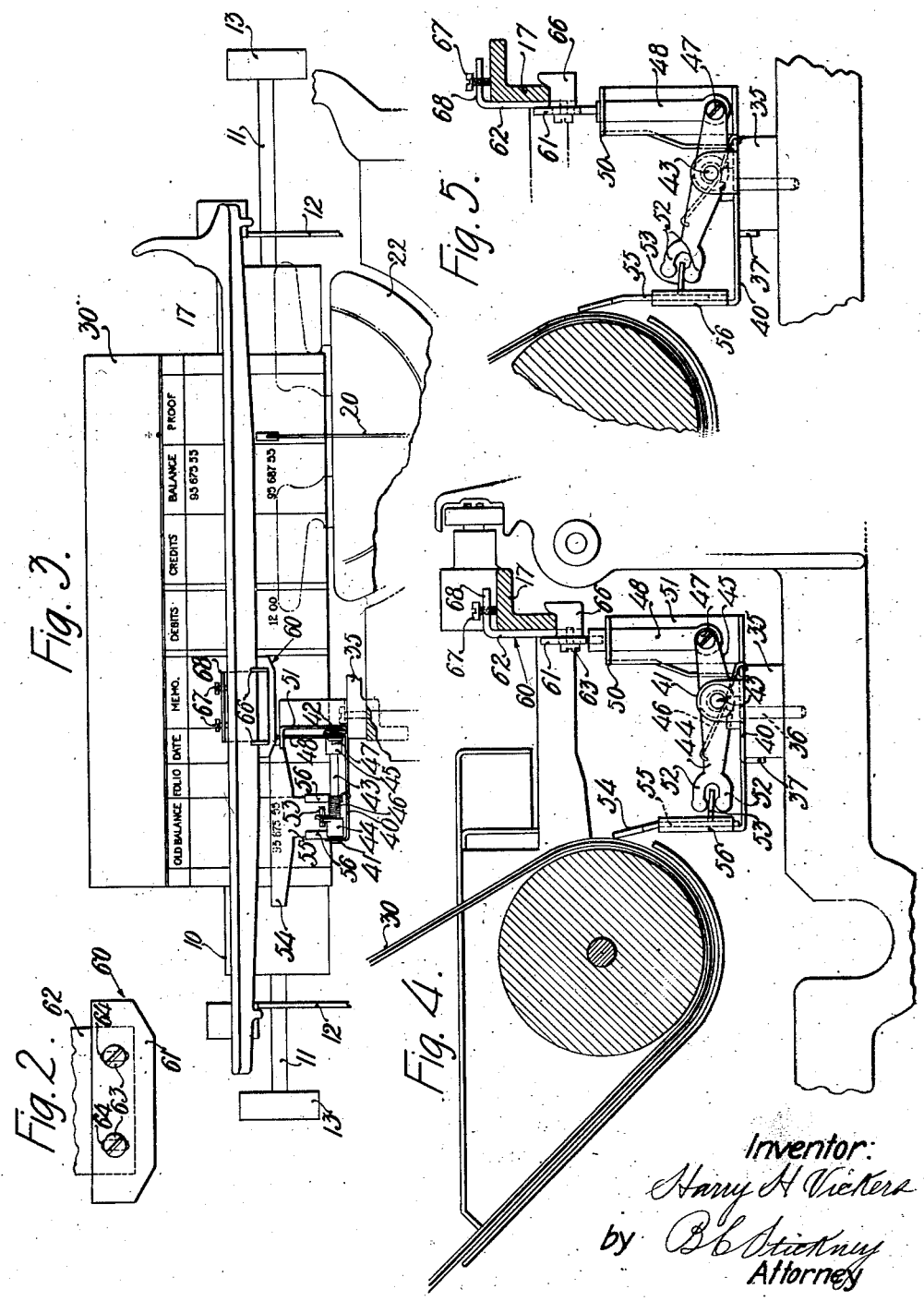
Inventor:
Harry H Vickers
by B.E. Stickney
Attorney

UNITED STATES PATENT OFFICE.

HARRY H. VICKERS, OF CORONA, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,416,766.  Specification of Letters Patent.  Patented May 23, 1922.

Application filed January 24, 1921. Serial No. 439,365.

*To all whom it may concern:*

Be it known that I, HARRY H. VICKERS, a citizen of the United States, residing in Corona, Long Island, in the county of Queens and State of New York, have invented certain new and useful Improvements in Combined Typewriting and Computing Machines, of which the following is a specification.

This invention relates to improvements in combined typewriting and computing machines of the Underwood-Hanson type, and is shown as applied to a machine equipped with a plurality of registers, as in the patent to Hart, No. 1,270,411, one of which may be used as a main computing register and another simply as a proving register. This invention is an improvement over the invention disclosed in the application of Walter J. Hausman, Serial No. 435,326, filed January 6, 1921.

It is customary to insert in the machine a ledger-sheet carrying a customer's account and showing the balance in favor of the dealer in one of the columns near the right-hand end, headed "Balance." In order to run this balance into the computing register, the old balance is copied and typed in the first column of the ledger-sheet adjoining the left-hand edge. The old balance is also run simultaneously into the proving register. In other columns are then typed the debits or credits, which are added or subtracted in the computing register to give a new balance; but these items do not affect the proving register which contains the old balance. The new balance is then typed in the "balance" column and simultaneously subtracted out of the computing register. The star key may then be operated to type the star, thereby showing that the computing register stands at zero, (see patent to Hart, No. 1,190,287).

In the last column near the right-hand edge, there is adapted to be typed, for proving purposes, the old balance with which the day's computations were begun, at the same time subtracting said balance out of the proving register. Assume the old balance to have been incorrectly typed in the "old balance" column, and hence incorrectly run into the computing and proving registers. If the operator looks in the "old balance" column and types the amount found there, he will subtract out of the proving register the same amount which was originally run in, and the star can be printed even though the amount was incorrectly copied into said "old balance" column. This invention, therefore, provides a blind or screen for covering up the amount in the "old balance" column, so that it is necessary to go to the original "balance" column to get the amount. Since the operator is not likely to make the same error twice in copying from the same amount, a different amount will be typed than that obtained in the proving register, the star key cannot be operated, and the error becomes apparent.

The screen employed in this invention is adapted to lie normally below the printing line, and is arranged to the left of the printing point a distance such that it co-operates with the "old balance" column of the ledger sheet when the "proof" column is in position to be typed. When the "proof" column is in such position, the screen is adapted to be automatically raised by a cam on the carriage to a height sufficient to cover the old balance in the "old balance" column, thus compelling the typist to copy the balance from the "balance" column into the "proof" column.

The upper edge of the screen is adapted to serve as an aligning gage in connection with the usual left-hand wing-scale, and may be graduated at its upper edge in a manner similar to said wing-scale.

Other features and advantages will hereinafter appear.

In the accompanying drawings,

Figure 1 is a perspective view of a combined typewriting and computing machine with the screen and its operating mechanism attached thereto, only the necessary co-operating parts of the machine being shown, and the ledger sheet being in position for typing the new balance.

Figure 2 is a front elevation of a cam member designed to raise the screen.

Figure 3 is a front view of the device in Figure 1, the carriage being in position to type the "proof" column of the ledger sheet, the screen being shown in raised or effective position.

Figure 4 is a vertical section showing the cam member out of engagement with the screen-operating mechanism, the screen being in lowered or ineffective position.

Figure 5 is a view similar to Figure 4, showing the cam member in engagement with the screen-operating mechanism, the screen being in raised or effective position.

A platen 10, fixed on a shaft 11, is journaled in the end walls 12 of a typewriter carriage frame. Said platen is rotatable by finger-wheels 13 on said shaft, or by line-space lever 14 operating slide 15 to cause a pawl (not shown) on said slide to engage ratchet-wheel 16 fixed to move with the platen shaft. Type-bars 20 are adapted to be swung upwardly and rearwardly by keys (not shown), being guided in slots 21 in a segment 22 fixed to the frame of the machine, and in a type-guide 24 fixed to said segment. Wing-scales 25 are fixed in position one to either side of the type-guide 24. The structure thus far described is found in the Underwood standard typewriter and in the combined typewriting and computing machine.

A ledger sheet 30 is shown in position around the platen. The sheet comprises a column for old balances, columns for miscellaneous data, columns for debits and credits, a column for the new balance, and, in this case, there is also a "proof" column. As already noted, this ledger sheet is adapted for use in a machine of the type described in the Hart Patent, No. 1,270,411, having a computing register and a proving register which can be set to operate together or separately.

Let it be assumed that the balance carried over as shown in the "balance" column is 95675.55. The "old balance" column is brought to the printing point and 9567.55 is typed therein and run into both the proving and computing registers simultaneously. The carriage is then moved towards the left, and the item 12.00 is typed in the "debits" column and run into the computing register, which now stands at 95687.55, but not into the proving register, which still reads 95675.55. There being no other items to be entered, the carriage is then moved over to bring the "balance" column into the printing position, and the new balance, as read from the computing register, is typed therein and simultaneously subtracted out of the computing register, which now stands at zero. The star key associated with the computing register may now be depressed for checking purposes.

The carriage is again moved towards the left, bringing the "proof" column to the printing point. The proving register contains the old balance as copied into the "old balance" column from the original "balance" column. The operator should go back to this original balance 95675.55 in the "balance" column, copying that figure into the "proof" column and simultaneously subtracting it out of the proving register. If the operator copied the above amount correctly into the "old balance" column and hence into the proving register, upon recopying this amount and subtracting it out of the proving register, the latter will stand at zero, and the star key may be operated. It is essential that the operator read the old balance from the "balance" column and not from the "old balance" column, for, if a mistake was made in copying the old balance into the "old balance" column, the same mistake would be entered in the proving register. If the operator types the incorrect amount of the "old balance" column in the "proof" column, the proving register will stand at zero when that amount is subtracted out, even though the old balance was incorrectly copied. However, if the operator copies the old balance from the "balance" column, the discrepancy between this amount and the incorrect amount of the "old balance" column and the proving register will become apparent, for, upon subtraction, the proving register will not stand at zero and the star key will not be capable of operation.

It is, therefore, essential that the operator copy the old balance from the "balance" column for typing in the "proof" column and subtracting from the proving register, and not from the "old balance" column. Means are therefore provided for covering up the amount in the "old balance" column when the "proof" column is in position to be typed, thus compelling the operator to look to the original "balance" column for the old balance. The means employed comprises a screen or blind normally ineffective, but adapted to be rendered effective when the "proof" column is in position to be typed.

A plate 40 is fixed to a block 35 on the frame of the machine at the left-hand side thereof by a screw 36 passing through said block into said frame. The plate 40 has downturned fingers 37 contacting with the frame to prevent rotation, and is provided also with upstanding portions 41 and 42, in which is journaled a shaft 43 having arms 44 and 45 fixed thereto and extending outwardly therefrom in opposite directions. A spring 46 normally presses arm 4 downwardly and hence arm 45 is pressed upwardly. The outer end of arm 44 is forked, forming prongs 52 adapted to engage a tongue 53, fixed to a vertical member or screen 54, having a stem 55 adapted to reciprocate between vertical guides 56 formed from plate 40. The upper edge of member 54 is adapted to lie adjacent the platen when elevated, and is graduated like an ordinary wing-scale.

Pivotally connected at 47 to the outer end of arm 45 is a vertical bar 48, guided at its upper end in a slot formed in a horizontal flange 50 on a vertical extension 51 of plate 40. Bar 48 extends upwardly to a point just beneath the front bar 17 of the carriage so that bar 17 normally clears the upper end of bar 48. A cam member 60 (see Figure 2) is adapted to be mounted upon front bar 17 to engage and depress vertical bar 48, thus rocking shaft 43 to swing arm 44 upward, and elevating screen 54. Cam member 60 is adapted to be attached to front bar 17 so as to engage bar 48 and render screen 54 effective in any desired position of the carriage. In the present case, the screen member is rendered effective, that is, elevated, when the "proof" column is in position to be typed.

Member 60 comprises a cam 61 adjustably fixed to a vertical member 62 by screws 63 operating in elongated slots 64. Projecting from the front face of cam 61 are fingers 66, adapted to engage beneath front bar 17, said fingers being adapted to be drawn up in contact with said bar by screws 67, projecting through the overturned ends 68 of vertical member 62 and engaging the upper edge of bar 17. It is thus apparent that, by loosening screws 67, the cam member 60 may be slid along bar 17 to any desired position.

In the operation of the device, the carriage travels from right to left. The cam member is fixed in position on the front rod of the carriage so that it comes in contact with and depresses bar 48 just before the "proof" column of the ledger sheet reaches the printing position. The depression of bar 48 causes the screen 54 to be elevated to hide the amount in the "old balance" column. The cam 61 is constructed of such length as to depress bar 48 as long as the "proof" column is being typed, thus compelling the operator to copy the old balance from the "balance" column.

Variations may be resorted to within the scope of the invention, and portions of the improvements may be used without others.

Having thus described my invention, I claim:

1. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a screen mounted on said machine and normally in ineffective position but adapted to be rendered effective to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

2. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a screen mounted on said machine and normally in ineffective position, and means carried by said carriage and adapted to render said screen effective to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

3. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a screen mechanism mounted on said machine, said screen mechanism comprising a shiftable screen normally in ineffective position, and means carried by said carriage and engaging said screen mechanism to shift said screen to effective position to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

4. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, and means adapted to engage the other end of the lever to rock said lever and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

5. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, and a cam carried by said carriage and adapted to engage the other end of the lever to rock said lever and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

6. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, and a cam adjustably mounted and capable of being variably positioned on said carriage, said cam being adapted to engage the other end of the lever to rock said lever and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

7. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, a cam mounted on said carriage, said cam being adjustable vertically to vary its throw and also laterally so as to be variably positioned along said carriage, said cam being adapted to engage the other end of the lever to rock said lever and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

8. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, a spring engaging said lever to hold said screen normally in lowered position below the printing line, and a cam carried by said carriage and adapted to engage the other end of the lever to rock said lever against the action of said spring and raise said screen above the printing line to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

9. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, a vertically movable link pivoted to the other end of said lever, and a cam carried by said carriage and adapted to depress said link to rock said lever and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

10. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, a vertically movable link pivoted at the other end of said lever, a spring engaging said lever to hold said screen normally in lowered position below the printing line, and a cam carried by said carriage and adapted to depress said link to rock said lever against the action of said spring and raise said screen to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

11. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a vertically shiftable screen, a lever pivoted on said machine and engaging said screen at one end, a spring engaging said lever to hold said screen normally in lowered position below the printing line, the upper edge of said screen being provided with graduations and adapted to lie adjacent the platen to form a wing-scale when said screen is elevated, and a cam carried by said carriage and adapted to engage the other end of the lever to rock said lever against the action of said spring, and raise said screen above the printing line to blind the amount in the "old balance" column when the "proof" column is in position to be typed, so that the amount typed in the "proof" column and subtracted from the proving register will be copied from the original "balance" column to avoid carrying over any mistake which might have been made in copying the amount into the "old balance" column.

HARRY H. VICKERS.

Witnesses:
CATHERINE A. NEWELL,
EDITH B. LIBBEY.